United States Patent
Braunbeck et al.

(10) Patent No.: US 9,399,438 B2
(45) Date of Patent: Jul. 26, 2016

(54) VEHICLE FRONT STRUCTURE

(71) Applicant: GM GLOBAL TECHNOLOGY OPERATIONS LLC, Detroit, MI (US)

(72) Inventors: Bardo Braunbeck, Oppenheim (DE); Ronald Scheer, Nastaetten (DE); Uwe Eckert, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/530,262

(22) Filed: Oct. 31, 2014

(65) Prior Publication Data

US 2015/0115633 A1 Apr. 30, 2015

(30) Foreign Application Priority Data

Oct. 31, 2013 (GB) .................................. 1319254.7

(51) Int. Cl.
*B60R 19/26* (2006.01)
*B60R 19/18* (2006.01)
*B60R 19/24* (2006.01)
*B60R 19/04* (2006.01)

(52) U.S. Cl.
CPC ................. *B60R 19/18* (2013.01); *B60R 19/04* (2013.01); *B60R 19/24* (2013.01); *B60R 2019/182* (2013.01); *B60R 2019/1866* (2013.01); *B60R 2019/247* (2013.01)

(58) Field of Classification Search
CPC  B60R 19/18; B60R 2019/1866; B60R 21/34; B60R 2019/1813; B60R 19/24; B60R 19/34; B62D 21/152; B62D 25/084; B62D 25/082
USPC ......... 293/132, 102, 110, 117, 120, 122, 133, 293/151, 154, 155; 296/203.02
See application file for complete search history.

(56) References Cited

U.S. PATENT DOCUMENTS

| | | | | |
|---|---|---|---|---|
| 3,284,101 A * | 11/1966 | Arnold | ................... | B60D 1/155 280/482 |
| 3,779,591 A * | 12/1973 | Rands | ...................... | F16F 7/127 188/375 |
| 3,907,352 A * | 9/1975 | Spain | ...................... | B60R 19/04 293/149 |
| 4,266,818 A * | 5/1981 | Hightower | .............. | B60R 19/14 188/371 |
| 4,413,856 A * | 11/1983 | McMahan | ............... | B60R 19/26 293/110 |
| 5,078,439 A * | 1/1992 | Terada | .................... | B60R 19/18 293/109 |
| 5,498,045 A * | 3/1996 | Morgan | .................. | B60R 19/18 293/122 |
| 5,997,058 A * | 12/1999 | Pedersen | ................. | B60R 19/18 293/102 |
| 6,042,163 A * | 3/2000 | Reiffer | .................... | B60R 19/18 293/102 |
| 6,192,584 B1 * | 2/2001 | Gundlach | ............... | B21C 23/14 29/897.2 |
| 6,296,287 B1 * | 10/2001 | Kinbara | .................. | B60R 19/18 293/120 |
| 6,343,820 B1 * | 2/2002 | Pedersen | ................ | B21D 53/88 293/102 |
| 6,371,541 B1 * | 4/2002 | Pedersen | ................. | F16F 7/127 293/132 |
| 6,382,709 B1 * | 5/2002 | Chirifu | ................... | B60R 19/24 276/29 |
| 6,886,873 B2 * | 5/2005 | Weykamp | ............... | B60R 19/26 293/133 |

(Continued)

FOREIGN PATENT DOCUMENTS

DE 19603954 A1 8/1997
DE 102012004743 A1 9/2013

(Continued)

*Primary Examiner* — Kiran B Patel
(74) *Attorney, Agent, or Firm* — Ingrassia Fisher & Lorenz PC

(57) ABSTRACT

A vehicle front structure includes a bumper beam formed as a hollow body having open ends, and elongation members received within the open ends and extending laterally outward.

11 Claims, 2 Drawing Sheets

(56) References Cited

U.S. PATENT DOCUMENTS

| | | | | |
|---|---|---|---|---|
| 6,964,096 B2* | 11/2005 | Tryland | ............... | B21C 23/14 29/897.2 |
| 7,066,508 B1* | 6/2006 | Baccouche | ............ | B60R 19/18 293/120 |
| 7,210,717 B1* | 5/2007 | Baccouche | ............ | B60R 19/18 293/102 |
| 7,543,866 B2* | 6/2009 | Arns | ............... | B60R 19/24 293/133 |
| 7,837,244 B2* | 11/2010 | Hashimura | ............ | B60R 19/18 293/102 |
| 8,414,041 B2 | 4/2013 | Paare et al. | | |
| 2001/0026073 A1* | 10/2001 | Sato | ............... | B60R 19/12 293/121 |
| 2002/0053805 A1* | 5/2002 | Azuchi | ............... | B60R 19/18 293/102 |
| 2003/0227183 A1* | 12/2003 | Weissenborn | ......... | B29C 44/08 293/120 |
| 2004/0084910 A1* | 5/2004 | Amano | ............... | B60R 19/18 293/102 |
| 2004/0160071 A1* | 8/2004 | Suganuma | ............ | B60R 19/12 293/132 |
| 2004/0174024 A1* | 9/2004 | Murata | ............... | B60R 19/18 293/109 |
| 2005/0212312 A1* | 9/2005 | Sakuma | ............... | B60R 19/34 293/133 |
| 2006/0244273 A1* | 11/2006 | Evans | ............... | B60R 19/18 293/102 |
| 2007/0176442 A1* | 8/2007 | Mori | ............... | B60R 19/34 293/133 |
| 2009/0160204 A1* | 6/2009 | Czopek | ............... | B60R 19/18 293/133 |
| 2009/0200810 A1* | 8/2009 | Roussel | ............... | B60R 19/18 293/120 |
| 2009/0267320 A1* | 10/2009 | Phillips | ............... | B60L 11/18 280/415.1 |
| 2010/0156080 A1* | 6/2010 | Napier | ............... | B60D 1/00 280/762 |
| 2012/0043772 A1* | 2/2012 | Kinefuchi | ............ | B60R 19/03 293/102 |
| 2012/0267908 A1* | 10/2012 | Kokubo | ............... | B60R 19/34 293/133 |
| 2012/0313398 A1 | 12/2012 | Shin et al. | | |
| 2014/0091585 A1* | 4/2014 | Ramoutar | ............ | B60R 19/24 293/133 |
| 2014/0091595 A1* | 4/2014 | Ramoutar | ............ | B60R 19/24 296/187.09 |
| 2015/0001880 A1* | 1/2015 | Matsuo | ............... | B62D 25/082 296/187.1 |

FOREIGN PATENT DOCUMENTS

| | | |
|---|---|---|
| JP | 2004306871 A | 11/2004 |
| JP | 2009248603 A | 10/2009 |

\* cited by examiner

Fig. 1
Fig. 2
Fig. 3
Fig. 4
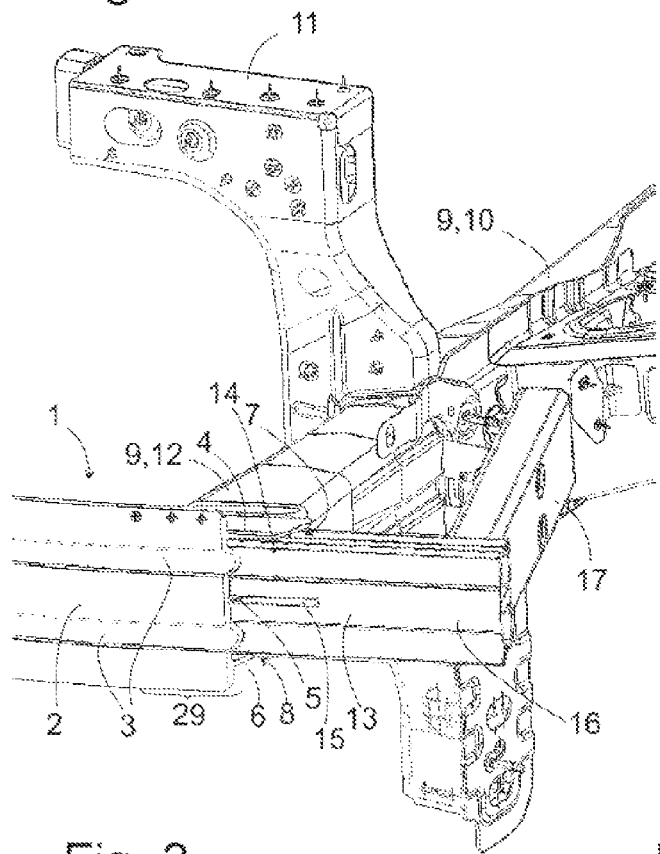
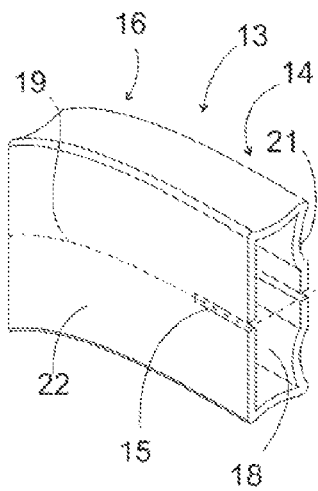
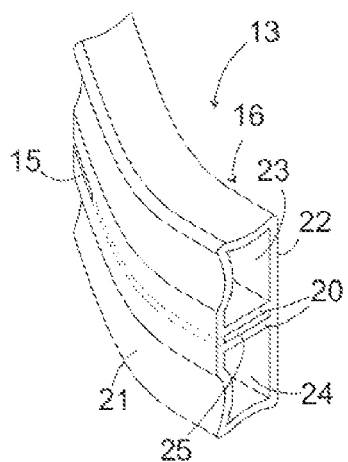
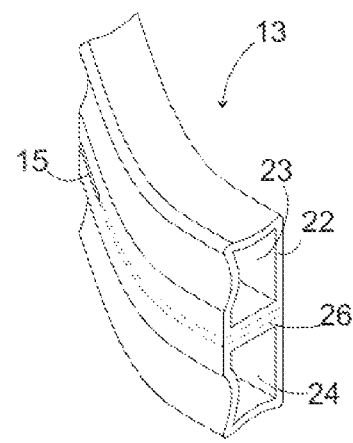

Fig. 5
Fig. 6
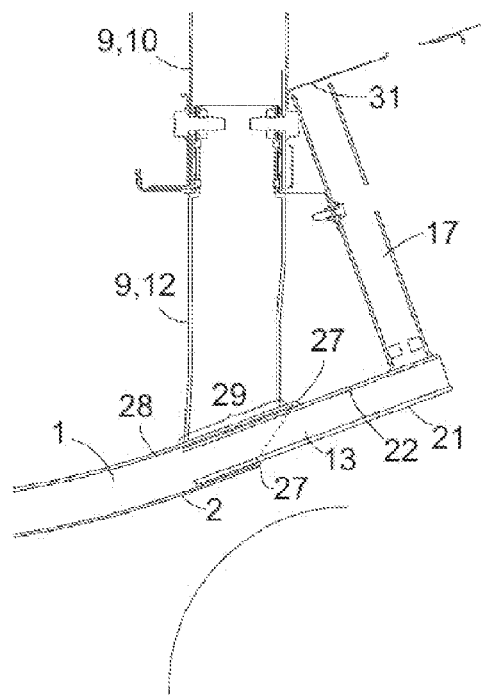
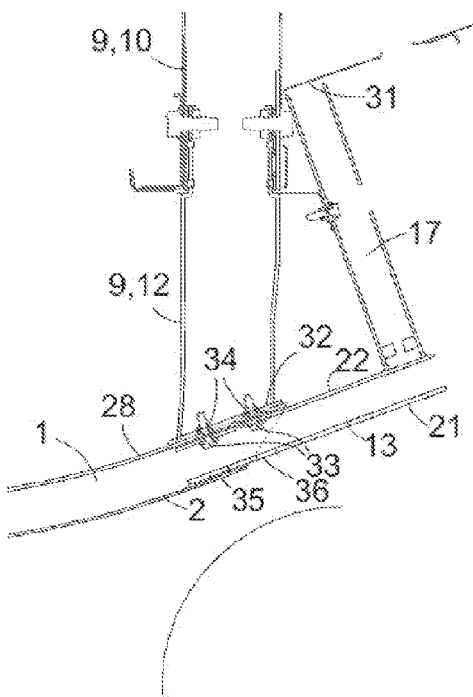

VEHICLE FRONT STRUCTURE

CROSS REFERENCE TO RELATED APPLICATION

This application claims priority to British Patent Application No. 1319254.7 filed Oct. 31, 2013, which is incorporated herein by reference in its entirety.

TECHNICAL FIELD

The present disclosure relates to a front structure for a motor vehicle including a bumper beam and elongation members connected to lateral ends of the bumper beam.

BACKGROUND

DE 10 2010 014 999 A1 suggests a front structure which combines one type of bumper beam with different types of elongation members such that front structures for vehicles of different widths can be formed using a small number of different parts.

A problem with this front structure arises from its tripartite structure. If a vehicle equipped with this front structure collides with an obstacle and the overlap between the vehicle's front structure and the obstacle is small, an elongation member that is subject to most of the force may come loose. As such, additional measures may be required to ensure the front structure exhibits suitable crashworthiness characteristics.

SUMMARY

The present disclosure provides a vehicle front structure which achieves crashworthiness characteristics for such front structures in case of a small overlap collision. According to an embodiment of the present disclosure, a vehicle front structure includes a bumper beam formed as a hollow body having open ends, and elongation members inserted in the open ends. This structure avoids a weak link between the bumper beam and the elongation members. Rather, a bumper including the bumper beam and the elongation members inserted therein according to the present disclosure can only be separated into pieces when a collision is violent enough to shatter at least one of the bumper beam and the elongation members.

The bumper beam may be formed as an extrusion profile. In such a profile, a moderate bend, as conventional bumper beams usually have, can be formed conveniently during or after extrusion. Since the bumper beam does not have to extend into corners of the vehicle body shell, there is no need to form sharp bends in it. The elongation members may also be extrusion profiles. Since these may extend into the corners of the vehicle body shell, they may need to have sharper bends than the bumper beam. However, since the elongation members are generally shorter than the bumper beam, sharp bends in the elongation members may be formed using smaller and, hence, less expensive tooling. The elongation members may have a horizontal symmetry plane. Such elongation members may be used indifferently at left and right sides of the vehicle, so that only a single set of tools is required for manufacturing elongation members for left and right-hand sides of the vehicle body.

A light metal such as aluminum or an aluminum alloy can be used for manufacturing the bumper beam and/or the elongation members. For reasons of stability, the bumper beam should include at least two compartments separated by a partition wall. In order to solidly fix the elongation members in the bumper beam, the elongation members should have slit in which the partition wall can be accommodated.

According to an embodiment of the present disclosure, the slit extends longitudinally within a wall of the elongation member. Such a slit should substantially not extend beyond an overlapping region of the bumper beam and elongation members. In order to accommodate the slit, the wall must be rather thick and sturdy, contributing substantially to the overall rigidity of the vehicle front structure.

According to a more light-weight embodiment, each elongation member has at least three compartments, the width of a central one of which corresponds to the thickness of the above-mentioned partition wall. In this embodiment, a slit which receives the partition wall of the bumper beam may be formed by cutting away outer walls of the central compartment.

In the overlapping region of the bumper beam and one of the elongation members, walls of the bumper beam and of the elongation member combine, making the overlapping region more rigid than other regions of the bumper beam and the elongation members. Therefore, longitudinal chassis beams should best be connected to the overlapping region. In particular, connecting members such as screws or rivets may fix the elongation members to the longitudinal chassis beams by extending across a wall of the bumper beam. In order to increase the impact resistance of a distal end of the elongation members, a support may be provided which connects an end portion of one of the elongation members which faces away from the bumper beam to one of the longitudinal chassis beams.

BRIEF DESCRIPTION OF THE DRAWINGS

The present disclosure will hereinafter be described in conjunction with the following drawing figures, wherein like numerals denote like elements.

FIG. 1 is a perspective view showing a portion of a vehicle front structure according to the present disclosure;

FIG. 2 is a perspective view of an elongation member which may be used in the vehicle front structure of FIG. 1;

FIG. 3 is a perspective view of a second embodiment of an elongation member;

FIG. 4 is a perspective view of a third embodiment of the elongation member;

FIG. 5 is a horizontal cross section of part of the vehicle front structure; and FIG. 6 is an alternative horizontal cross section of the vehicle front structure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 is a perspective view showing a portion of a vehicle front structure according to the present disclosure. The front structure includes a bumper beam 1 extruded from aluminum or aluminum alloy. In FIG. 1, only a right-hand end portion of the bumper beam 1 is shown. The bumper beam 1 includes a front wall 2, a rear wall and three walls 4, 5, 6 which extend between front wall 2 and rear wall, delimiting upper and lower compartments 7, 8. The stiffness of the front wall 2 is increased by two grooves 3 formed in it, which extend horizontally over the entire length of the bumper beam 1.

The rear wall is not visible in the view of FIG. 1. It is fixed to a forward end of a longitudinal chassis beam 9, which extends over a length of the vehicle body. The chassis beam has central portion 10 made of two thick-walled, rigid pieces of sheet metal which combine to form a hollow profile. A hood lock support 11 is connected to a front end central portion 10. A front end portion of the chassis beam 9 is formed by a crash box 12, a front wall of which is fixed to the rear wall of bumper beam 1, and a rear portion of which is inserted into chassis beam central portion 10.

An elongation member 13 extruded from the same light metal as bumper beam 1 is shown in a configuration in which it is about to be installed in the vehicle front structure. The elongation member 13 has an inner end portion 14 which, in FIG. 1, is just about to be inserted in the compartments 7, 8 of bumper beam 1. When the elongation member 13 has reached its final location, most of the slit 15, which in FIG. 1 is still distinctly visible, will have disappeared within bumper beam 1 and will be filled by the partition wall 5 extending between its compartments 7, 8. An outer end portion 16 of elongation member 13 has a support 17 fixed to its rear side, an end of which will finally be connected a chassis beam central portion 10, close to its front end. Here, the support is a tubular profile of rectangular cross section.

If in a collision the front structure of FIG. 1 is hit directly in front of the crash box 12, it will exhibit a very high bending resistance, since the walls of bumper beam 1 are supported by those of the elongation member 13 inserted in it. If, however, the elongation member 13 is hit in its outer end portion 16, a substantial part of the load can be transferred to the bumper beam 1, since the inner end portion 14 is prevented from turning or bending by the fact that it is snugly fitted within compartments 7, 8. Further, another part of the load is transmitted to the chassis beam central portion 10 by support 17. Therefore, the elongation member 13 will absorb a substantial amount of impact energy, and if it does yield to the collision impact, it will tend to deflect the vehicle laterally, in a direction in which overlap with the obstacle is still further reduced, and in which the vehicle may eventually slip past the obstacle. In this way, a vehicle front wheel located behind the elongation member 13 is effectively protected from the collision impact and from being urged towards the passenger compartment.

FIG. 2 is a perspective view of an elongation member 13 according to a first embodiment. The elongation member 13, in this case, is a hollow profile with a single inner compartment 18 and with walls 21, 22, the outer cross section of which closely mates that the cross section of bumper beam compartments 7, 8, so that an inner end portion 14 of elongation member 13, including slit 15, will be tightly held in bumper beam 1 when inserted into one of its ends.

The elongation member 13 has a horizontal symmetry plane, identified by dash-dot lines 19 in FIG. 2, so that it can be inserted into bumper beam 1 from both ends alike.

Inner end portion 14 is bent slightly, matching the curvature of bumper beam 1. In outer end portion 16, the bend is more pronounced.

FIG. 3 is a perspective view of another embodiment of the elongation member 13. According to this embodiment, there are two partition walls 20 extending between front and rear walls 21, 22 of the elongation member, defining upper and lower compartments 23, 24 and a central compartment 25 in between. The height of the central compartment 25 corresponds exactly to the thickness of partition wall 5 of bumper beam 1. In the inner end portion 14 of elongation member 13, outer walls of the central compartment 25 are removed, whereby the slit 15, extending all across elongation member 13 in the vehicle longitudinal direction is formed. Here, too, the bend of elongation member 13 is more pronounced in its outer end portion 16.

In the embodiment of FIG. 4, upper and lower compartments 23, 24 are the same as in FIG. 3, but instead of the two partition walls 20 and the central compartment 25, there is just one thick wall 26, and the slit 15 is cut in wall 26 in the longitudinal direction thereof FIG. 5 is a schematic horizontal cross section of a right-hand half of the vehicle front structure (the left-hand half, not shown, being the mirror image thereof). As indicated by a dashed line in FIG. 5, the end of bumper beam 1 is cut obliquely, so as to facilitate insertion of the inner end portion 14 of elongation member 13. The elongation member 13 is fixed by weld seams 27 extending along the edges of bumper beam front wall 2, bumper beam rear wall 28, and, optionally, upper and lower walls 4, 6.

A region 29 in which the bumper beam 1 and the elongation member 13 overlap extends just across crash box 12 in the vehicle transversal direction, welded to rear wall 28. Support 17 has its front end welded to rear wall 22 of elongation member 13. It is fixed, although not too rigidly, to chassis beam 9 by being screwed to a sheet metal strip 30, part of which engages into a gap between a wall of chassis beam central portion 10 and the crash box inserted therein. In case of a collision strip 30 will yield rather easily, but even so, it will prevent a rear end of support from bending away from chassis beam 9. The rear end of support 17 will abut against a structure 31 projecting laterally from chassis beam central portion 10 and thus prevent elongation member 13 from yielding prematurely.

In the embodiment of FIG. 6, a flange 32 forms a forward end of crash box 12. Screws 33 extend through holes in the rear walls 22, 28 of elongation member 13 and bumper beam 1 and of flange 32 and engage nuts 34 inside crash box 12.

In the embodiment shown, the front walls 2, 21 of bumper beam 1 and elongation member 13 have holes 35 which are aligned with respect to each other when elongation member 13 is correctly inserted, and by which one of the screws 33 is inserted. Due the oblique cut at the end of the bumper beam 1, the other screw 33 is accessible by a hole 36 in elongation member 13 alone, although both screws engage the rear walls 22, 28 of both the elongation member 13 and the bumper beam 1.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A vehicle front structure comprising:
    a bumper beam formed by a front wall and a rear wall defining a hollow body having first and second open ends, wherein the bumper beam further includes an inner wall extending from the rear wall into the hollow body at the first open end, and
    an elongation member with first and second member ends respectively inserted into said first and second open ends of the bumper beam and extending therefrom, the elongation member defining a longitudinal slit extending from the first member end that engages the inner wall when the first member end is inserted into the first open end of the bumper beam.

2. The vehicle front structure of claim 1, wherein the bumper beam is an extrusion profile.

3. The vehicle front structure of claim 1, wherein the elongation members are extrusion profiles.

4. The vehicle front structure of claim 1, wherein the elongation members have a horizontal symmetry plane.

5. The vehicle front structure of claim 1, wherein at least one of said bumper beam and said elongation members is made of light metal.

6. The vehicle front structure of claim 1, wherein the bumper beam comprises at least two compartments separated by a partition wall.

7. The vehicle front structure of claim 1, wherein each elongation member has at least three compartments, the width of a central one of said compartments corresponding to a thickness of the partition wall.

8. The vehicle front structure of claim 1, wherein the elongation members are curved more strongly than the bumper beam.

9. The vehicle front structure of claim 1, wherein the bumper beam comprises a connecting member configured to secure the bumper beam to a longitudinal chassis beam in a region where the bumper beam and the elongation members overlap.

10. The vehicle front structure of claim 9, wherein the connecting member extends across a wall of the bumper beam and fixes the elongation members to the longitudinal chassis beams.

11. The vehicle front structure of claim 9, wherein a support is configured to connect an end portion of one of said elongation members which faces away from the bumper beam to one of said longitudinal chassis beams.

* * * * *